United States Patent
Vignal et al.

(10) Patent No.: US 10,483,907 B2
(45) Date of Patent: *Nov. 19, 2019

(54) ELECTRICAL CONNECTION DEVICE FOR A PHOTOVOLTAIC SYSTEM

(71) Applicant: ArcelorMittal, Luxembourg (LU)

(72) Inventors: Renaud Vignal, Sevrier (FR); Laurent Geron, Cerexhe-Heuseux (BE); Lionel Fourdrinier, Saint Gilles (BE)

(73) Assignee: ArcelorMittal, Luxembourg (LU)

( * ) Notice: Subject to any disclaimer, the term of this patent is extended or adjusted under 35 U.S.C. 154(b) by 0 days.

This patent is subject to a terminal disclaimer.

(21) Appl. No.: 15/576,897

(22) PCT Filed: May 26, 2015

(86) PCT No.: PCT/IB2015/000754
§ 371 (c)(1),
(2) Date: Nov. 27, 2017

(87) PCT Pub. No.: WO2016/189342
PCT Pub. Date: Dec. 1, 2016

(65) Prior Publication Data
US 2018/0152135 A1     May 31, 2018

(51) Int. Cl.
*H02S 40/34* (2014.01)
*H02S 20/25* (2014.01)
(Continued)

(52) U.S. Cl.
CPC ........... *H02S 40/34* (2014.12); *H01R 25/162* (2013.01); *H02S 20/25* (2014.12); *H02S 40/36* (2014.12)

(58) Field of Classification Search
CPC .......... H02S 40/34; H02S 40/36; H02S 20/25; H01R 25/162; Y02B 10/12
See application file for complete search history.

(56) References Cited

U.S. PATENT DOCUMENTS 6,482,992 B2    11/2002  Scholz et al.
7,291,036 B1*   11/2007  Daily ................. H05K 7/20445
                                                         439/487
(Continued)

FOREIGN PATENT DOCUMENTS

CN     101589476 A     11/2009
CN     101922211 A     12/2010
(Continued)

OTHER PUBLICATIONS

Corresponding Search Report for International Application No. PCT/IB2015/000754.

*Primary Examiner* — Adriana Figueroa
(74) *Attorney, Agent, or Firm* — Davidson, Davidson & Kappel, LLC

(57) ABSTRACT

The present invention provides a building exterior cladding panel. The panel includes an upper overlap area, a lower overlap area, and a central part covered by at least one photovoltaic module. A perforation is located in the lower overlap area and traversed by an electrical cable connecting one of two electrical poles of the photovoltaic module to an electrical plug located on the reverse side of the panel in the lower overlap area. An opening is located in the upper overlap area, into which is inserted an electrical junction box connected to another electrical pole of the photovoltaic module by an electrical cable. The junction box includes: a base, a lateral wall surrounding the base and extending perpendicular to it, the lateral wall includes, on its external surface, a peripheral shoulder to hold the box in place in the opening, a cable lead, situated in the part of the junction box located above the peripheral shoulder to connect to the electrical junction box to the other electrical pole of the photovoltaic module, an internal cavity delimited by the base and the wall, including an electrical terminal with an (Continued)

axis perpendicular to the base and a movable electrical switch. The invention further provides an associated electrical junction box.

9 Claims, 5 Drawing Sheets

(51) Int. Cl.
*H02S 40/36* (2014.01)
*H01R 25/16* (2006.01)

(56) References Cited

U.S. PATENT DOCUMENTS

| | | | |
|---|---|---|---|
| 7,445,508 B2 | 11/2008 | Daily et al. | |
| 7,506,477 B2* | 3/2009 | Flaherty | E04D 1/08 136/244 |
| 7,824,189 B1* | 11/2010 | Lauermann | H02S 40/34 136/246 |
| 7,884,278 B2 | 2/2011 | Powell et al. | |
| 8,341,900 B2 | 1/2013 | Reyal et al. | |
| 8,701,360 B2* | 4/2014 | Ressler | E04D 1/08 136/244 |
| 8,714,998 B2 | 5/2014 | Jautard | |
| 8,740,642 B2 | 6/2014 | Keenihan et al. | |
| 8,776,455 B2 | 7/2014 | Azoulay | |
| 8,853,520 B2* | 10/2014 | Ueda | H01L 31/05 136/244 |
| 10,199,984 B2* | 2/2019 | Shetty | H01R 13/506 |
| 2008/0110490 A1* | 5/2008 | Duesterhoeft | H02S 40/34 136/248 |
| 2008/0253092 A1* | 10/2008 | Duesterhoeft | H01L 31/02 361/710 |
| 2009/0114263 A1 | 5/2009 | Powell et al. | |
| 2010/0018572 A1* | 1/2010 | Grimberg | H02G 3/086 136/252 |
| 2010/0105245 A1* | 4/2010 | Good | H01R 12/7035 439/571 |
| 2012/0013191 A1 | 1/2012 | Jeandeaud et al. | |
| 2013/0146118 A1* | 6/2013 | Kelley | H05K 5/02 136/244 |
| 2014/0293553 A1* | 10/2014 | Stanelli | H05K 5/0247 361/730 |
| 2015/0340990 A1* | 11/2015 | Kim | E04F 13/0864 136/251 |
| 2018/0152136 A1 | 5/2018 | Vignal et al. | |

FOREIGN PATENT DOCUMENTS

| | | | |
|---|---|---|---|
| CN | 102460731 A | 5/2012 | |
| CN | 102535769 A | 7/2012 | |
| EA | 200970984 A1 | 6/2010 | |
| EA | 201101239 A1 | 2/2012 | |
| EP | 2442371 A1 | 4/2012 | |
| EP | 2600078 A2 | 6/2013 | |
| JP | H0762802 A | 3/1995 | |
| JP | H10102708 A | 4/1998 | |
| JP | 2001055815 A | 2/2001 | |
| JP | 2001332756 A | 11/2001 | |
| JP | 2004132123 A | 4/2004 | |
| JP | 2011503846 A | 1/2011 | |
| JP | 2011520267 A | 7/2011 | |
| JP | 2013030678 A | 2/2013 | |
| RU | 2296739 C2 | 4/2007 | |
| RU | 2313642 C1 | 12/2007 | |
| WO | 2008000101 A1 | 1/2008 | |
| WO | WO2008000101 A1 | 1/2008 | |
| WO | 2009059028 A2 | 5/2009 | |
| WO | 2009090347 A2 | 7/2009 | |
| WO | WO-2009114766 A2 * | 9/2009 | H02S 40/34 |
| WO | 2010092052 A2 | 8/2010 | |

\* cited by examiner

ELECTRICAL CONNECTION DEVICE FOR A PHOTOVOLTAIC SYSTEM

This invention relates to an electrical junction box for an exterior building cladding panel that supports at least one photovoltaic module. A panel of this type is designed principally for the construction of photovoltaic roofs, although it is not limited to that application.

BACKGROUND

It is known that roof coverings with corrugated panels can be manufactured, for example from pre-coated galvanized steel, the edges of which overlap to ensure the watertightness of the roof.

It is also known, in particular from WO2009090347, that photovoltaic modules can be pieced together to cover the building with photovoltaic modules. These can in particular be modules in the form of flexible strips attached with adhesive to the surface of the troughs of the corrugated panel. In the future, they may also be photovoltaic devices installed directly on the surface of the troughs of the corrugated panel, in particular by vacuum deposition processes or deposition at atmospheric pressure. These modules are connected to one another by a network of cables, the majority of which are preferably located on the rear surface of the cladding to avoid the premature deterioration of the cables and to preserve the aesthetic appearance of the building.

However, an arrangement of this type has the disadvantage that it requires access to the underlayment to make the connection, on the back side of the corrugated panels, of two successive modules.

It is known from JP10102708 that the use of cables can be avoided by resorting, on one hand, to a male electrical connector located in the vicinity of the lower extremity of the panel and on the reverse side, and on the other hand a female electrical connector located in the vicinity of the upper extremity of the panel and on the upper surface. During the assembly of two longitudinally adjacent roof panels, the male electrical connector of the upper panel is inserted into the female electrical connector of the lower panel, which electrically connects the photovoltaic module of the upper panel to the photovoltaic module of the lower panel.

However, an arrangement of this type does not make it possible to adapt the wiring plan of the photovoltaic installation in case of roofing features such as, for example, a chimney outlet, a ventilation shaft, a garret window, a skylight or a trap door. Resorting to electric cables to bypass the feature in the roof is incompatible with the male and female electrical connectors.

SUMMARY OF THE INVENTION

An object of the present invention is to resolve the above mentioned problems by proposing an electrical junction box that facilitates the assembly of panels and the wiring of the photovoltaic modules.

The present invention provides an electrical junction box for building exterior cladding panel supporting at least one photovoltaic module comprising an electrical pole on one of its longitudinal extremities and one electrical pole of reverse polarity on the other extremity, the junction box comprising:
  a base,
  a lateral wall surrounding the base and extending perpendicular to it, the lateral wall comprising, on its external face, a peripheral shoulder intended to hold the box in place in an opening made on the exterior cladding panel,
  a cable outlet situated in the part of the junction box located above the peripheral shoulder, intended to connect the electrical junction box to an electrical pole of the photovoltaic module supported by the panel,
  an internal cavity delimited by the base and the wall, comprising an electrical terminal with an axis perpendicular to the base, intended for the connection of an electrical plug located on the reverse side of an adjacent exterior cladding panel,
  a movable electrical switch connecting the electrical terminal to the cable outlet and located on the lateral wall of the junction box.

The junction box according to the invention can also have the following optional characteristics, considered individually or in combination:
  the peripheral shoulder is located in the upper third of the lateral wall,
  the peripheral shoulder is continuous over the periphery of the lateral wall,
  the cable outlet is adjacent to the peripheral shoulder,
  the cable outlet is in the form of an electrical terminal that can be connected to an electrical plug,
  the movable electrical switch comprises an electrical conductor provided with two extremities, each of the extremities being in electrical contact with the electrical terminal and the cable outlet respectively,
  the electrical terminal and the cable outlet are each in electrical contact with an electrical socket, the two electrical sockets being made accessible by withdrawing the movable electrical switch of the junction box.

The present invention further provides a building exterior cladding panel comprising:
  an upper transverse edge comprising an upper overlap area intended to be covered by an adjacent panel,
  a lower transverse edge comprising a lower overlap area intended to overlap an adjacent panel,
  a central part connecting the transverse edges, covered by at least one photovoltaic module comprising an electrical pole on one of its longitudinal extremities and an electrical pole of reverse polarity on the other extremity,
  a perforation located in the lower overlap area and traversed by an electrical cable connecting one of the two electrical poles of the photovoltaic module to an electrical plug located on the reverse side of the panel in the lower overlap area,
  an opening located in the upper overlap area, into which is inserted an electrical junction box which is connected to the other electrical pole of the photovoltaic module by means of an electrical cable, the junction box comprising:
    a base,
    a lateral wall surrounding the base and extending perpendicular to it, the lateral wall comprising, on its external surface, a peripheral shoulder to hold the box in place in the opening,
    a cable outlet, situated in the part of the junction box located above the peripheral shoulder to connect the electrical junction box to the other electrical pole of the photovoltaic module,
    an internal cavity, delimited by the base and the wall, comprising an electrical terminal with an axis perpendicular to the base, intended for the connection of an electrical plug located in the reverse side of an adjacent exterior cladding panel, a movable electrical switch connecting the electrical terminal to the cable outlet and located on the lateral wall of the junction box.

The panel according to the invention can also have the optional characteristic according to which it comprises a recess surrounding the opening.

Other characteristics and advantages of the invention will become apparent from a reading of the following description.

BRIEF DESCRIPTION OF THE DRAWINGS

To illustrate the invention, tests have been conducted and will be described by way of non-restricting examples, in particular with reference to the accompanying figures which show.

The invention will be better understood by reading the following description, given by way of a non-restricting example, with reference to the accompanying figures which show.

In the figures, the same reference numbers identify the same components.

DETAILED DESCRIPTION

Throughout the text, a panel is defined as a component with a flat shape, i.e. with a low thickness compared to its other dimensions. The panel can be in the form of a plate or sheet constituted by a single material or a composite assembly. In the latter case, the panel consists of a stack of a plurality of layers of the same material or different materials. The material in question can be, among other things, a metal material, a polymer or even a ceramic. By way of non-restricting examples, reference can be made to metal materials such as steel, aluminum, copper and zinc. The panel is preferably a metal plate. It is preferably galvanized steel pre-coated to protect it against corrosion. The panel can optionally be foamed on the interior surface and thereby constitute the exterior cladding of a sandwich panel.

In the context of the invention, the panel will preferably have been previously formed by means of any known forming process, among which reference can be made by way of non-restricting examples to bending, shaping, stamping and molding.

To form an exterior building cladding, such as a roof or a façade, the panels are assembled by marginal overlapping of their longitudinal edges and their transverse edges and are fastened to the load-bearing structure of the building by fastening means such as bolts, nails or even rivets.

In the remainder of the description, to facilitate an understanding of the invention, reference will be made only to a roof, although the invention can also be used for any exterior building cladding.

Throughout the text, "photovoltaic module" means an assembly of photovoltaic cells connected to one another, preferably in series, and insulated from the outside by a protective barrier. By way of non-restricting example, such photovoltaic modules can be in the form of flexible strip glued to the central part of the panel or a module constructed directly on the central part of the panel by successive deposition of layers of appropriate types by vacuum or atmospheric pressure deposition processes.

Within each photovoltaic module, the arrangement and the organization of the photovoltaic cells are not restrictive. By way of a non-restricting example, the cells can be arranged one underneath the other in a single row or can be arranged in a plurality of rows, the rows being connected to one another to form a sort of folded strip. Preferably, and to facilitate the manufacture of photovoltaic modules directly on the panel by vacuum deposition processes or deposition at atmospheric pressure, the cells are arranged in a single row.

In the context of the invention, the photovoltaic module comprises an electrical pole on one of its longitudinal extremities and an electrical pole of reverse polarity on the other extremity.

Figure 1:
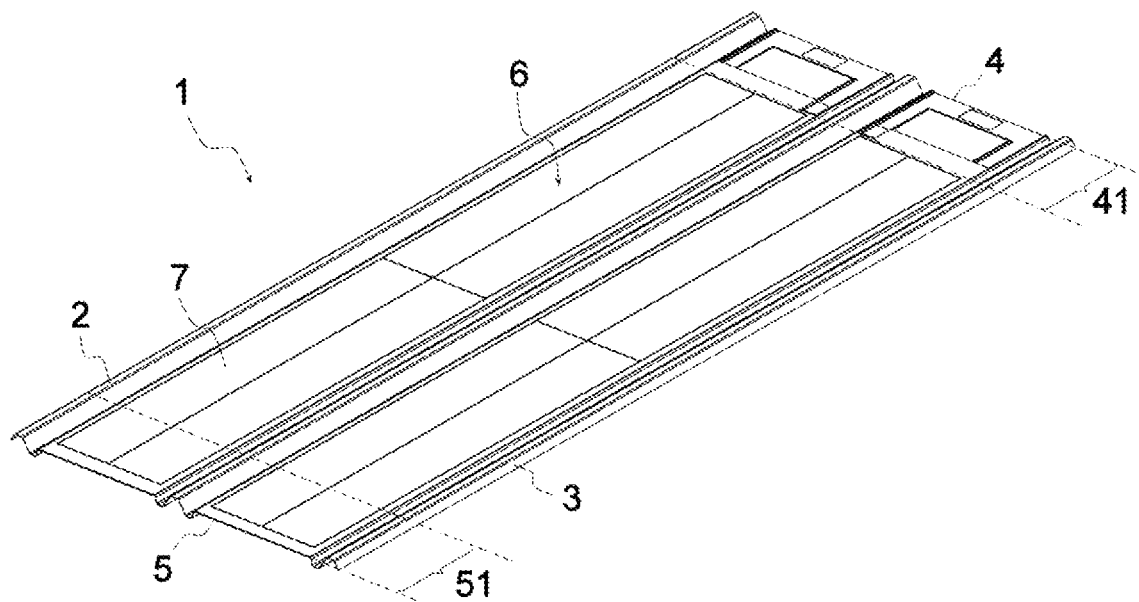
FIG. 1 is a view in perspective of an exterior building cladding panel supporting at least one photovoltaic module.

With reference to FIG. 1, the panel 1 of the exterior building cladding is constituted principally by a first longitudinal edge 2, a second longitudinal edge 3, an upper transverse edge 4 and a lower transverse edge 5, and the four edges are connected by a central part 6 covered by at least one photovoltaic module 7.

The upper transverse edge 4 comprises an upper overlap area 41 intended to be covered by an adjacent panel during the assembly of the roof. This upper overlap area generally has a width between 150 and 500 mm, depending on the pitch of the roof, among other things.

The lower transverse edge 5 comprises a lower overlap area 51 intended to cover an adjacent panel during the assembly of the roof. This lower overlap area generally has a width between 150 and 500 mm depending on the pitch of the roof, among other things.

Figure 2:
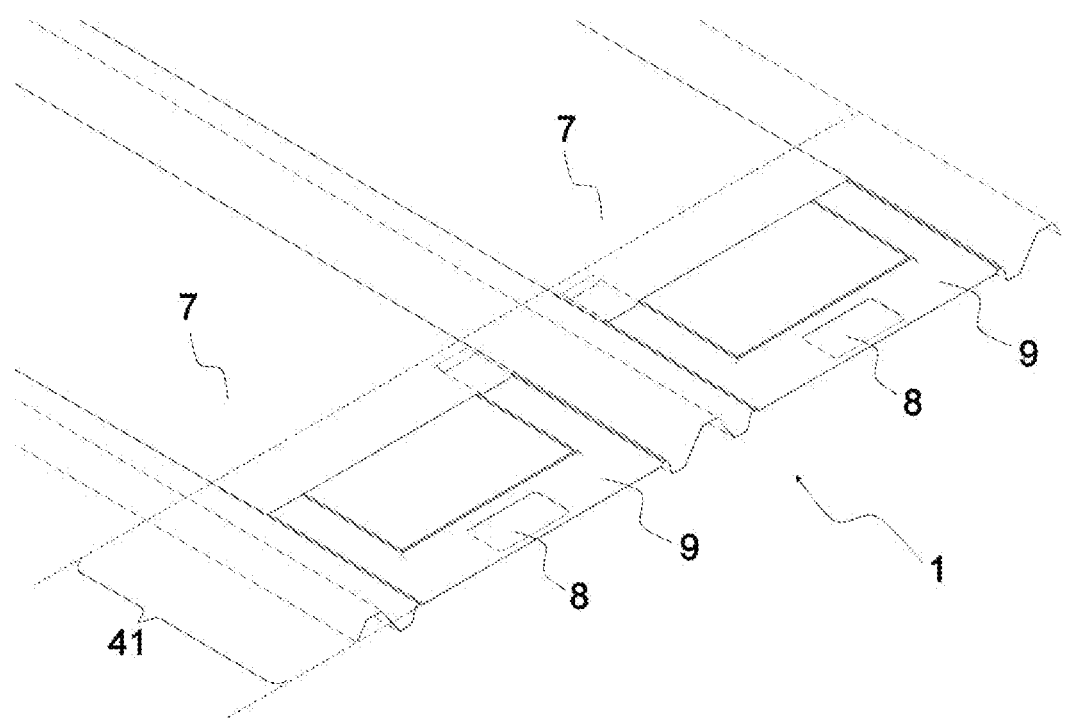
FIG. 2 is a view in perspective of the upper part of the panel illustrated in FIG. 1.

With reference to FIG. 2, the upper overlap area 41 of the panel 1 comprises an opening 8 intended for the insertion of an electrical junction box. The dimensions of the opening are adapted to the electrical junction box provided for this purpose. In particular, the dimensions are adapted taking into consideration thermal expansion and the loads that can be exerted on the panel during use.

The opening 8 can be obtained by any cutting technique known to a person skilled in the art, including among others, to cite non-restrictive examples, punching, milling, mechanical cutting, laser cutting, water cutting or oxyacetylene cutting.

Preferably, the upper overlap area 41 of the panel 1 also comprises a recess 9 surrounding the opening 8. This recess makes it possible to set the junction box lower compared to the perimeter of the recess and to integrate the electrical cables that connect the junction box to the photovoltaic module 7. By adapting the respective dimensions of the recess, of the junction box and of the electrical cables, it is thereby possible to create a joint that covers the upper overlap area 41 by the lower overlap area 51 of an adjacent panel. This arrangement is advantageous in terms of creating a watertight seal in the assembly of two adjacent panels.

The recess 9 can be obtained by stamping of the panel or by any other forming technique known to a person skilled in the art and appropriate to the situation.

Figure 3:
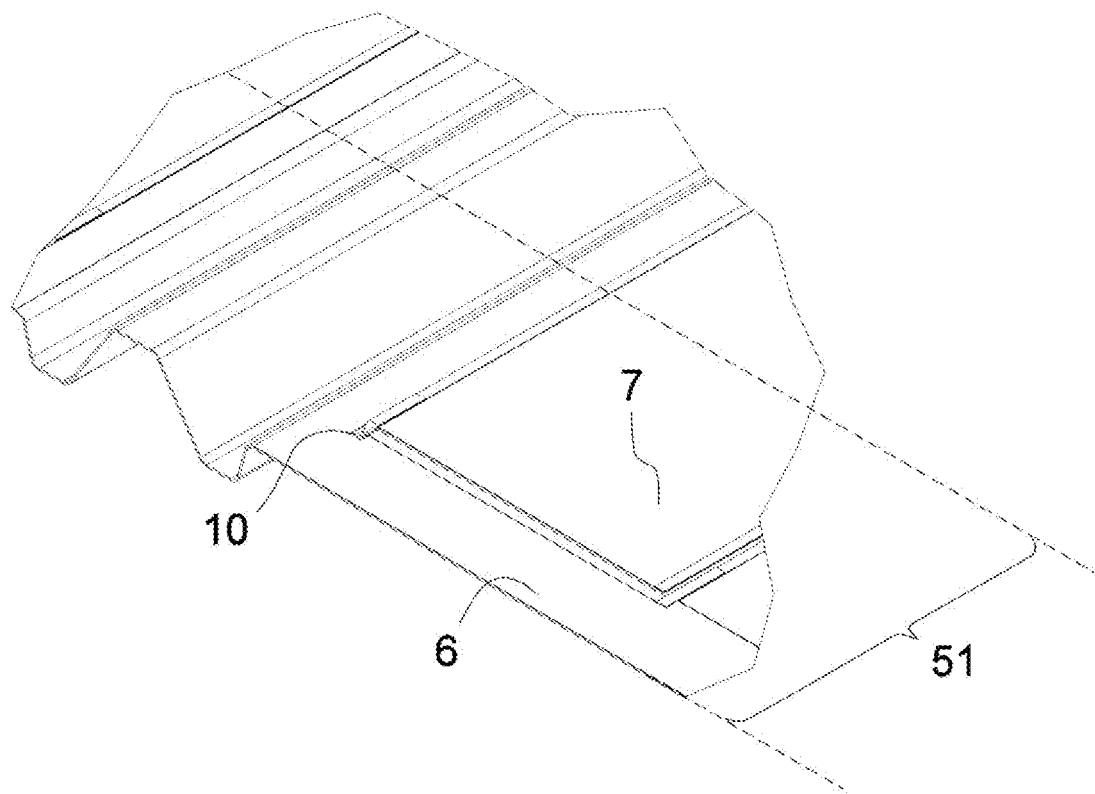
FIG. 3 is a view in perspective of the lower part of the panel illustrated in FIG. 1.

With reference to FIG. 3, the lower overlap area 51 comprises a perforation 10, i.e. an opening made on the thickness of the panel. The perforation 10 makes it possible to pass, on the rear surface of the panel, an electrical cable connected to the photovoltaic module 7.

The perforation 10 can be obtained by any cutting technique known to a person skilled in the art including, by way of nonrestrictive examples, punching, milling, mechanical cutting, laser cutting, water cutting or oxyacetylene cutting.

Figure 4:
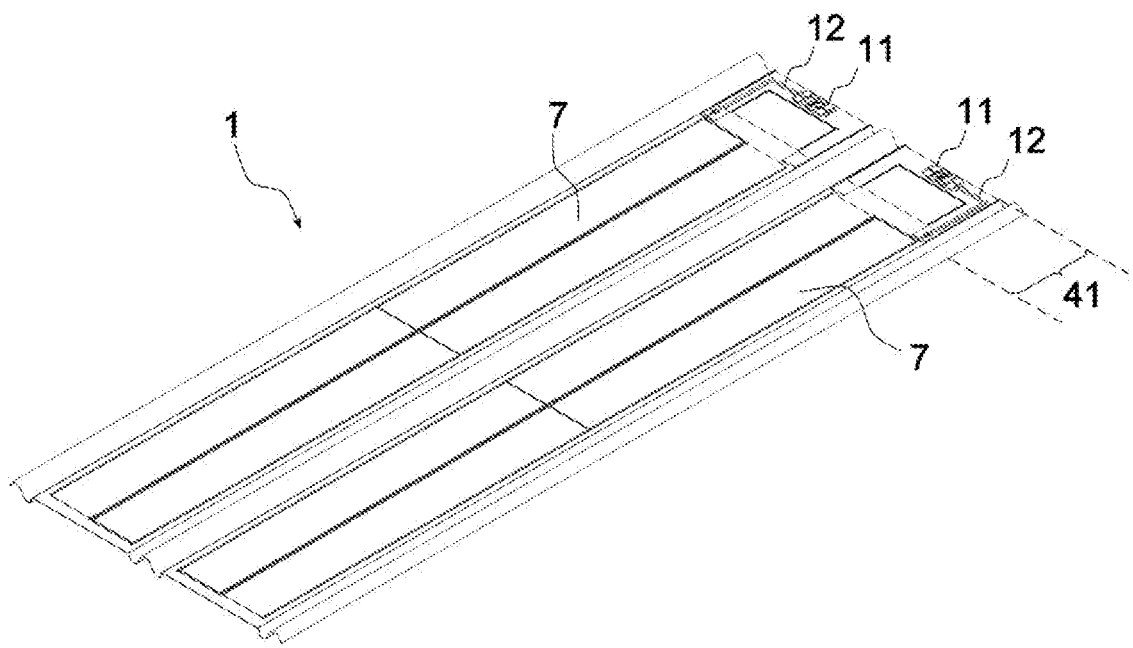
FIG. 4 is a view in perspective of an exterior building cladding panel supporting at least one photovoltaic module.

With reference to FIG. 4, the panel 1 also comprises a junction box 11 inserted into the opening 8 made in the panel 1 in the upper overlap area 41. The junction box 11 is connected to the photovoltaic module 7, and in particular to its electrical pole located on its upper extremity, by means of an electrical cable 12.

Figure 5:
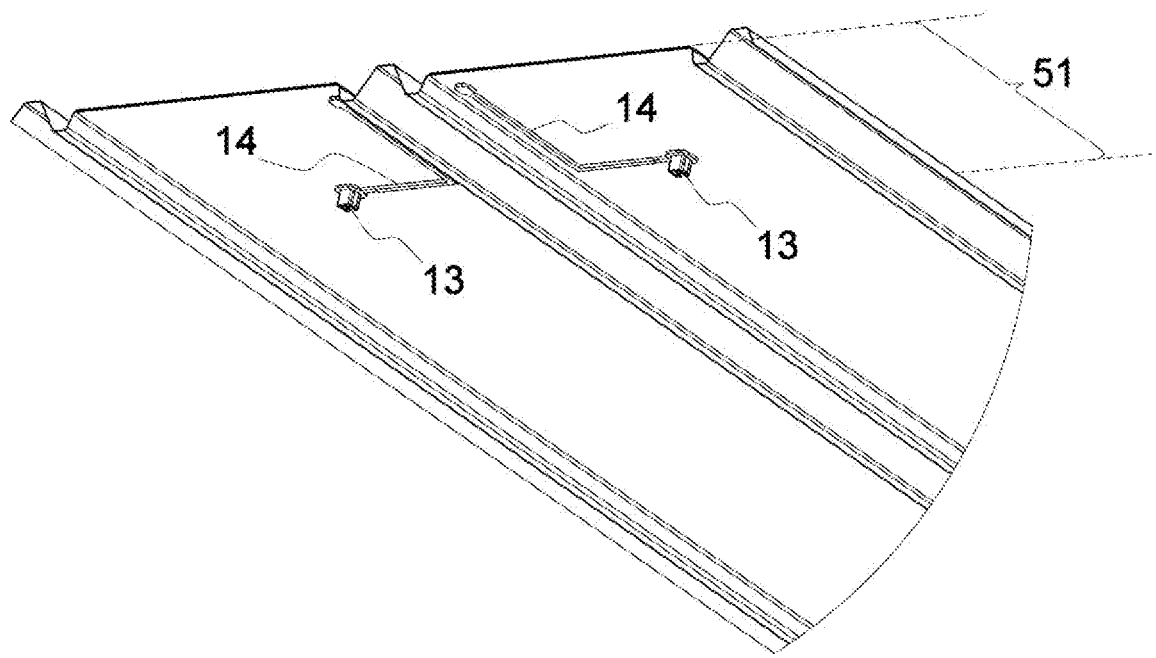
FIG. 5 is a view in perspective of the reverse side of the lower part of the panel illustrated in FIG. 4.

With reference to FIG. 5, the panel 1 also comprises an electrical plug 13 located on the reverse side of the panel in the lower overlap area 51. The electrical plug 13 is connected to the photovoltaic module 7 and in particular to its electrical pole located on its lower extremity, by means of electrical cable 14. The electrical cable 14 traverses the panel 1 at the level of the perforation 10.

The electrical plug 13 is intended to be connected to the junction box of an adjacent panel 1, when the lower overlap area 51 of the panel supporting the electrical plug covers the upper overlap area 41 of the adjacent panel. In this manner, the photovoltaic modules supported by these two panels are electrically connected.

Figure 6:
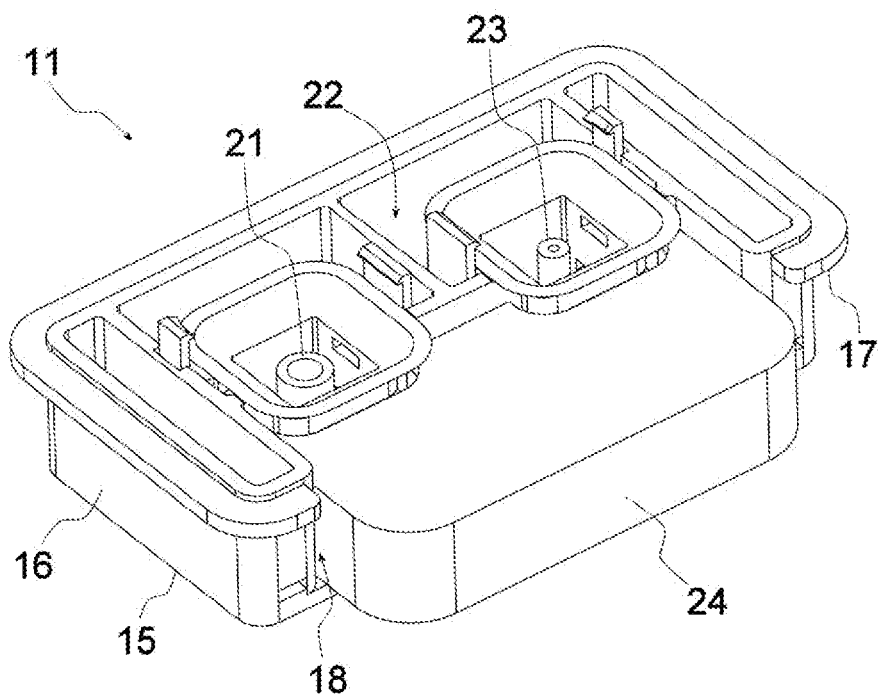
FIG. 6 is a view in perspective of an electrical junction box in a first embodiment.

With reference to FIG. 6, the junction box 11 is described in a first embodiment.

First of all, the junction box comprises a base 15 bordered by a lateral wall 16 which rises perpendicular to the base.

Preferably, the base 15 contains no opening in order to facilitate the proper water tightness of the junction box.

Preferably, the base 15 is flat to minimize the space occupied by the junction box and to allow its proper insertion at the level of the overlapping area between two adjacent exterior cladding panels.

In the illustrated embodiment, the lateral wall 16 has a rectangular section and is thus formed by four lateral side walls. In the framework of the invention, however, other wall sections are also possible.

The base and the lateral wall are preferably made of insulating material, for example by molding of a synthetic material, in particular plastic.

The lateral wall 16 comprises a peripheral shoulder 17 on its external face.

The peripheral shoulder 17 makes it possible to support the junction box against the exterior cladding panel when the box, and in particular the lateral wall, is inserted into the opening 8 made in the exterior cladding panel.

Preferably, the peripheral shoulder 17 is constituted by a bulge made of the same material as the lateral wall of the junction box. The shoulder can also be fabricated at the same time as the lateral wall, for example by molding.

The peripheral shoulder 17 is preferably located in the upper third of the lateral wall, and most preferably at the level of the upper edge of the lateral wall, so that the junction box projects as little as possible beyond the upper surface of the exterior cladding panel. A configuration of this type makes it possible to ensure a proper overlapping of two longitudinally adjacent exterior cladding panels.

The peripheral shoulder 17 is preferably continuous over the periphery of the lateral wall. This makes it possible to facilitate the realization of a waterproof seal between the junction box and the exterior cladding panel. However, it is possible to provide a discontinuous peripheral shoulder if a good seal is not necessary at this level.

For the same reasons of waterproofing, it is possible to provide a seal on the lower surface of the peripheral shoulder. This seal will be squeezed between the junction box and the panel when the box is installed in the panel. This seal can be constituted by an adhesive that connects the junction box to the exterior cladding panel.

With reference to FIG. 6, the base 15 and the lateral wall 16 define an interior cavity 22.

The interior cavity 22 comprises an electrical terminal 23 with an axis perpendicular to the base.

The electrical terminal 23 makes it possible to electrically connect the junction box of a first panel 1 to the electrical plug 13 of a second panel 1 during the assembly of two adjacent panels. In particular, when the lower overlap area 51 of the upper panel is placed on the upper overlap area 41 of the lower panel; by a translation movement perpendicular to the plane of the panels, the electrical terminal 23 of the junction box of the lower panel and the electrical plug 13 of the upper panel are fitted together.

The electrical terminal 23 may be a male terminal or a female terminal. The type of electrical plug 31 will simply be adapted as appropriate.

The person skilled in the art will know how to adjust the geometry and respective dimensions of the electrical terminal 23 and of the electrical plug 13 to ensure a good electrical connection and good waterproofing after the electrical terminal 23 and the electrical plug 13 are fitted together.

The interior cavity 22 can be partly closed by a cover (not shown) that closes the cavity with the exception of the upper extremity of the electrical terminal 23.

With reference to FIG. 6, the junction box also comprises a cable outlet 21 located in the part of the junction box that is above the peripheral shoulder 17, or in
other words in the part of the box accessible from the upper surface of the panel 1 once the junction box 11 is inserted into the opening 8 of the panel.

This cable outlet 21 makes it possible to connect the upper electrical pole of the photovoltaic module to the junction box by means of the electrical cable 12.

The fact that the cable outlet 21 is located in the part of the junction box above the peripheral shoulder 17 makes it possible to prevent the panel 1 from having to be perforated to allow passage of the electrical cable 12.

In one embodiment of the invention, the cable outlet 21 is adjacent to the peripheral shoulder. This arrangement makes it possible for the electrical cable 12 to fit flush with the panel 1. The cable can also be glued to the panel and its small size facilitates the overlapping of the panel by an adjacent panel.

In the illustrated embodiment of the invention, the cable outlet 21 is in the form of an electrical terminal with an axis perpendicular to the base and located in the interior cavity 22. This electrical terminal can be connected to an electrical plug located on the extremity of the electrical cable 12 intended to connect the upper electrical pole of the photovoltaic module 7 to the junction box 11. The electrical terminal can be a male terminal or a female terminal. The type of electrical plug of the electrical cable 12 will simply be adapted as appropriate.

Alternatively, the cable outlet 21 makes possible the passage of an electrical cable connected directly to the interior of the junction box.

With reference to FIG. 6, the junction box 11 further comprises a movable electrical switch 24 located on the lateral wall of the junction box.

The movable electrical switch 24 by default connects the electrical terminal 23 to the cable outlet 21 and makes it possible to open the electrical circuit between the electrical terminal 23 and the cable outlet 21. If the electrical circuit is opened, the electrical connection between two photovoltaic modules 7 supported by two adjacent panels 1 is no longer possible. On the other hand, it is then possible to electrically connect the photovoltaic modules supported by distant panels by means of an additional electrical cable, as will be described in greater detail below with reference to FIG. 9.

The movable electrical switch 24 is located on the lateral wall of the junction box, preferably on the lateral wall side destined to be oriented toward the upper transverse edge 4 of the panel. It is thereby easy to access the switch when the junction box is inserted into the panel 1, which is itself installed on the roof. In fact, the operator then does not need to access the underlayment to access the movable electrical switch. Access to the upper transverse edge 4 of the panel 1 will suffice to provide access to the switch.

Depending on the depth of the recess 9 and/or the position of the peripheral shoulder 17, the electrical switch may be located above or below the peripheral shoulder.

Preferably, the movable electrical switch 24 is inserted into an opening 18 made in the lateral wall of the junction box. A portion of the movable electrical switch projects beyond the lateral wall. It is then easy to grasp the movable electrical switch and to remove it from the junction box by pulling upward.

Figure 7:
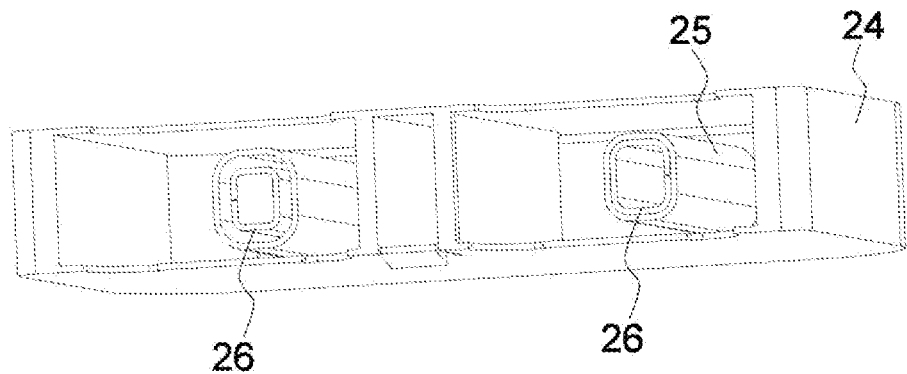
FIG. 7 is a view in perspective of a movable electrical switch.

With reference to FIG. 7, the movable electrical switch 24 is in the form of an approximately rectangular parallelepiped, one lateral side of which is open to provide access to the hollow structure of the part. The interior of the part includes an electrical conductor 25 equipped with two extremities 26 that are flush with the open lateral side.

When the movable electrical switch 24 is inserted into the junction box, the electrical connector 25 makes it possible to establish the electrical connection between the electric terminal 23 and the cable outlet 21, each of the extremities 26 being in electrical contact with respectively the electrical terminal 23 and the cable outlet 21.

Figure 8:
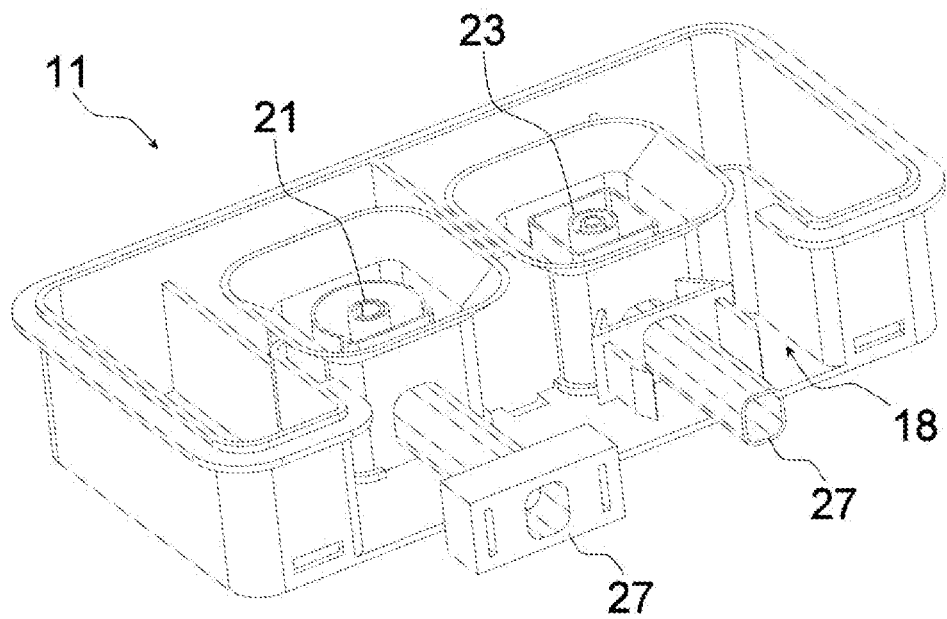
FIG. 8 is a view in perspective of an electrical junction box.

With reference to FIG. 8, the removal of the movable electrical switch 24 from the junction box provides access to two electrical sockets 27. Each of the electrical sockets 27 is in electrical contact with respectively the electrical terminal 23 and the cable outlet 21.

Figure 9:
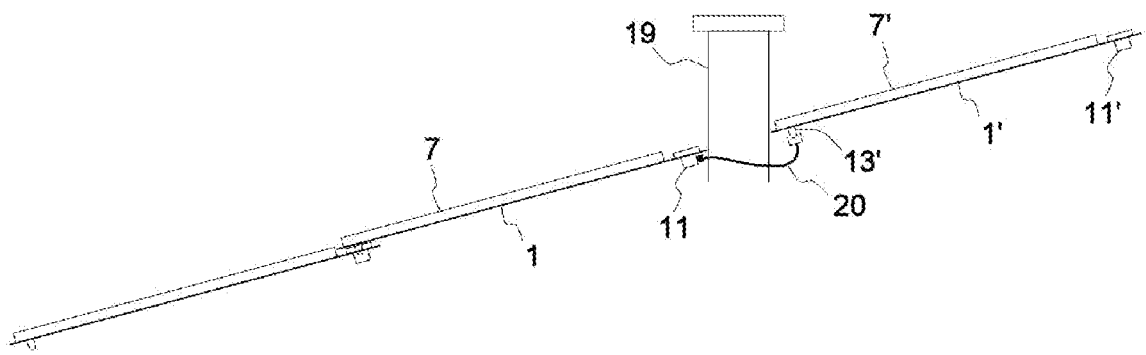
FIG. 9 is a schematic sectional view of a roof comprising two exterior cladding panels supporting at least one photovoltaic module.

This removable electrical switch makes it possible to adapt the wiring plan depending on the roof features, as illustrated in FIG. 9. In case of a roof feature such as a chimney shaft 19, the photovoltaic module 7 supported by the panel 1 adjacent to the roof feature cannot be electrically connected to the panel 1' located on the other side of the roof feature simply by plugging the electrical plug 13' of the panel 1' into the junction box 11 of the panel 1. By removing the movable electrical switch, it is then possible to electrically connect one extremity of an electrical cable 20 to the junction box of the panel 1 adjacent to the roof feature. The other extremity of the electrical cable 20 is connected to the electrical plug 13' of the panel 1' located on the other side of the roof feature.

More particularly, the withdrawal of the movable electrical switch gives access to the electrical socket 27 which is electrically connected to the cable outlet 21, which is itself electrically connected to the photovoltaic module 7 supported by the panel 1 by means of the electrical cable 12. By connecting the electrical cable 20 to this electrical socket 27, the photovoltaic module 7 is then electrically connected to the photovoltaic installation, and in particular to the photovoltaic module 7' supported by the panel 1' and electrically connected to the electrical plug 13'.

Given the position of the movable electrical switch 24, the electrical cable 20 used is on the underside of the panels 1. This makes it possible to prevent the premature deterioration of the cable and to preserve the aesthetic appearance of the building.

The removal of the movable electrical switch 24 alternatively makes it possible to connect to the junction box other electronic devices that will make possible, for example, additional functions of the junction box. By way of nonrestrictive examples, these can be an electronic control unit, a micro converter etc.

Figure 10:
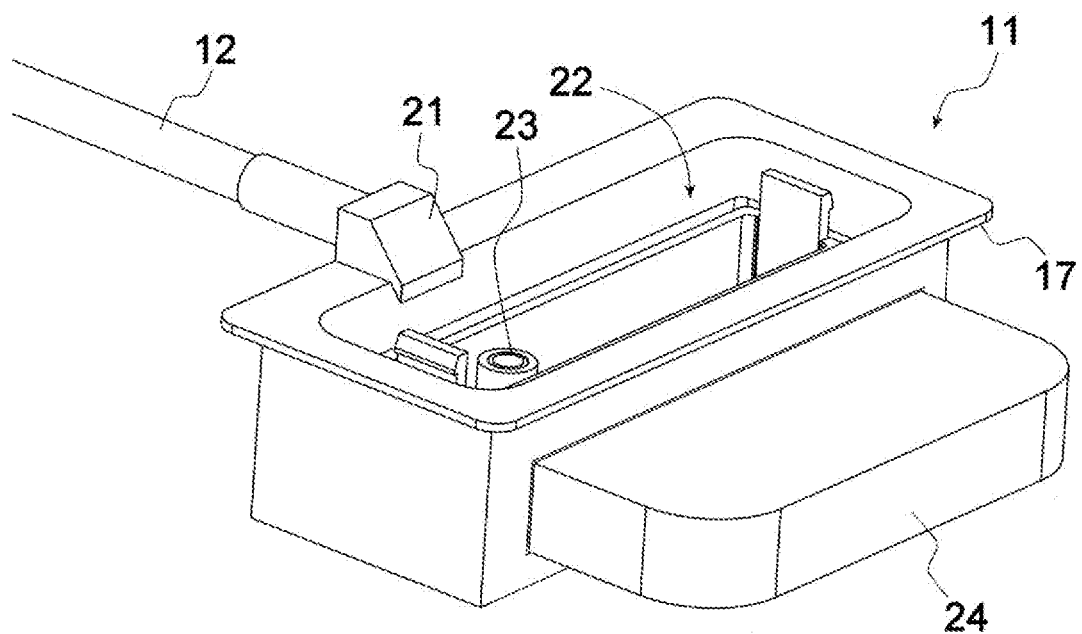
FIG. 10 is a view in perspective of an electrical junction box in a second embodiment.

With reference to FIG. 10, a second embodiment of the junction box 11 is described below.

In this second embodiment, the junction box 11 comprises all of the characteristics of the junction box according to the first embodiment, with the exception of the characteristics described below.

In this embodiment, the cable outlet 21 is in the form of a socket adjacent to the peripheral shoulder 17, into which the electrical cable 12 is plugged. This arrangement allows the electrical cable 12 to be flush with the panel 1. The cable can therefore be adhesively connected to the panel and its small size facilitates the overlapping of the panel by an adjacent panel.

The interior cavity 22 is open and comprises only the electrical terminal 23. During the assembly of the panels 1, the electrical terminal 23 is fitted into the electrical plug 13 located on the reverse side of an adjacent panel, the electrical plug 13 then acting as a cover for the junction box 11.

What is claimed is:

1. A building exterior cladding panel comprising:
    an upper transverse edge including an upper overlap area intended to be covered by an adjacent panel;
    a lower transverse edge including a lower overlap area intended to overlap a further adjacent panel;
    a central part connecting the upper and lower transverse edges, covered by at least one photovoltaic module including an electrical pole on a longitudinal extremity and a further electrical pole of reverse polarity on another longitudinal extremity;
    a perforation located in the lower overlap area and traversed by an electrical cable connecting one of the two electrical poles of the photovoltaic module to an electrical plug located on a reverse side of the panel in the lower overlap area;
    an opening located in the upper overlap area, into which is inserted an electrical junction box connected to the other of the two electrical poles of the photovoltaic module by an electrical cable, the electrical junction box comprising:
        a base;
        a lateral wall surrounding and extending perpendicular to the base, the lateral wall including, on an external surface, a peripheral shoulder intended to hold the electrical junction box in place in the opening;

a cable outlet, situated in a part of the junction box located above the peripheral shoulder to connect the electrical junction box to the other electrical pole of the photovoltaic module;

an internal cavity delimited by the base and the wall, including an electrical terminal with an axis perpendicular to the base, intended for the connection of an electrical plug located on a reverse side of the or the further adjacent exterior cladding panel;

a movable electrical switch connecting the electrical terminal to the cable outlet and located on the lateral wall of the junction box.

2. The building exterior cladding panel as recited in claim 1, further comprising:

a recess surrounding the opening.

3. An electrical junction box for a building exterior cladding panel supporting at least one photovoltaic module comprising an electrical pole on a longitudinal extremity and a further electrical pole of reverse polarity on another longitudinal extremity, the junction box comprising:

a base;

a lateral wall surrounding and extending perpendicular to the base, the lateral wall including, on an external surface, a peripheral shoulder intended to hold the box in place in an opening on the exterior cladding panel;

a cable outlet, situated in a part of the junction box located above the peripheral shoulder, intended to connect the electrical junction box to one of the two electrical poles of the photovoltaic module supported by the panel;

an internal cavity delimited by the base and the lateral wall, including an electrical terminal with an axis perpendicular to the base, intended for the connection of an electrical plug located on a reverse side of an adjacent exterior cladding panel; and a movable electrical switch connecting the electrical terminal to the cable outlet and located on the lateral wall of the electrical junction box.

4. The electrical junction box as recited in claim 3, wherein the peripheral shoulder is located in an upper third of the lateral wall.

5. The electrical junction box as recited in claim 3, wherein the peripheral shoulder is continuous over the periphery of the lateral wall.

6. The electrical junction box as recited in claim 3, wherein the cable outlet is adjacent to the peripheral shoulder.

7. The electrical junction box as recited in claim 3, wherein the cable outlet is an electrical terminal that can be connected to an electrical plug.

8. The electrical junction box as recited in claim 3, wherein the movable electrical switch comprises an electrical conductor provided with two extremities, each of the extremities being in electrical contact with respectively the electrical terminal and the cable outlet.

9. The electrical junction box as recited in claim 3, wherein the electrical terminal and the cable outlet are each in electrical contact with an electrical socket, the two electrical sockets being made accessible by withdrawing the movable electrical switch of the electrical junction box.

* * * * *